March 8, 1966   L. J. BERGGREN ET AL   3,239,588
METHOD FOR TUBULAR BIAXIAL ORIENTATION
Original Filed Nov. 15, 1961   3 Sheets-Sheet 1
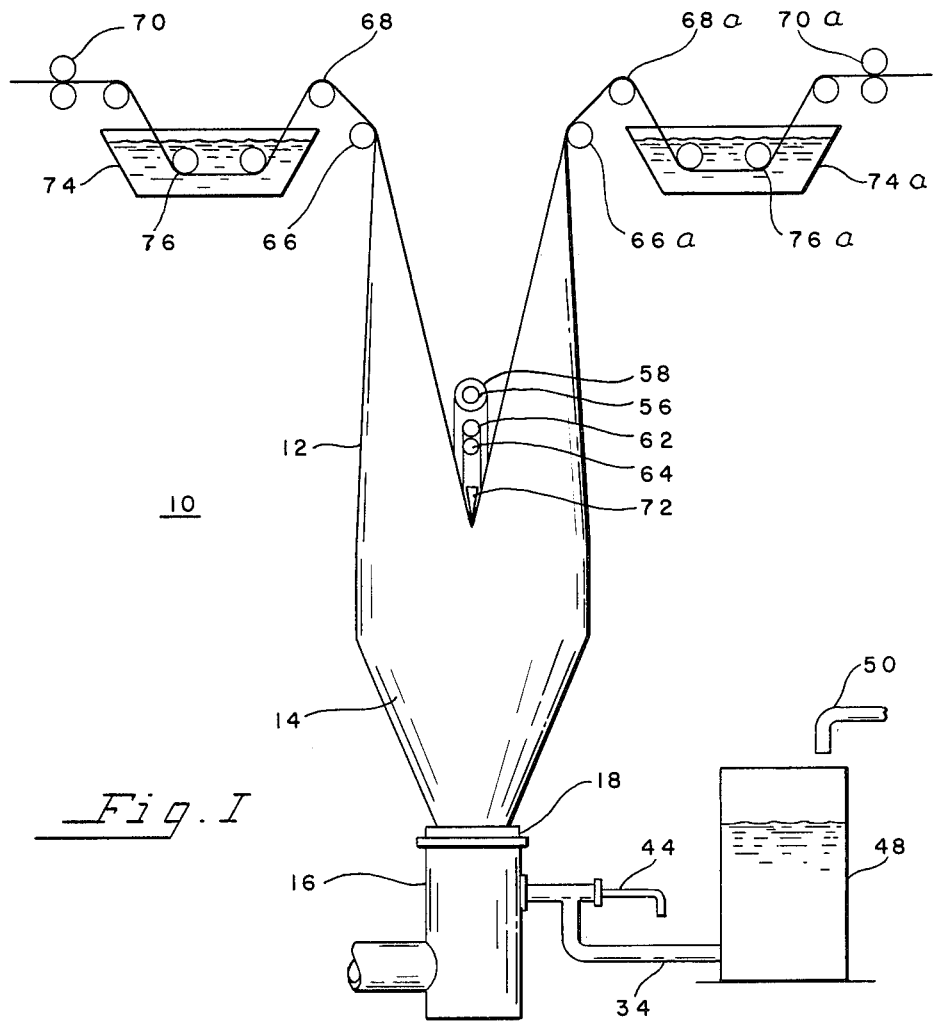
LORING J. BERGGREN
CHARLES T. HATHAWAY
INVENTOR.
BY James C. Logomasini
ATTORNEY.

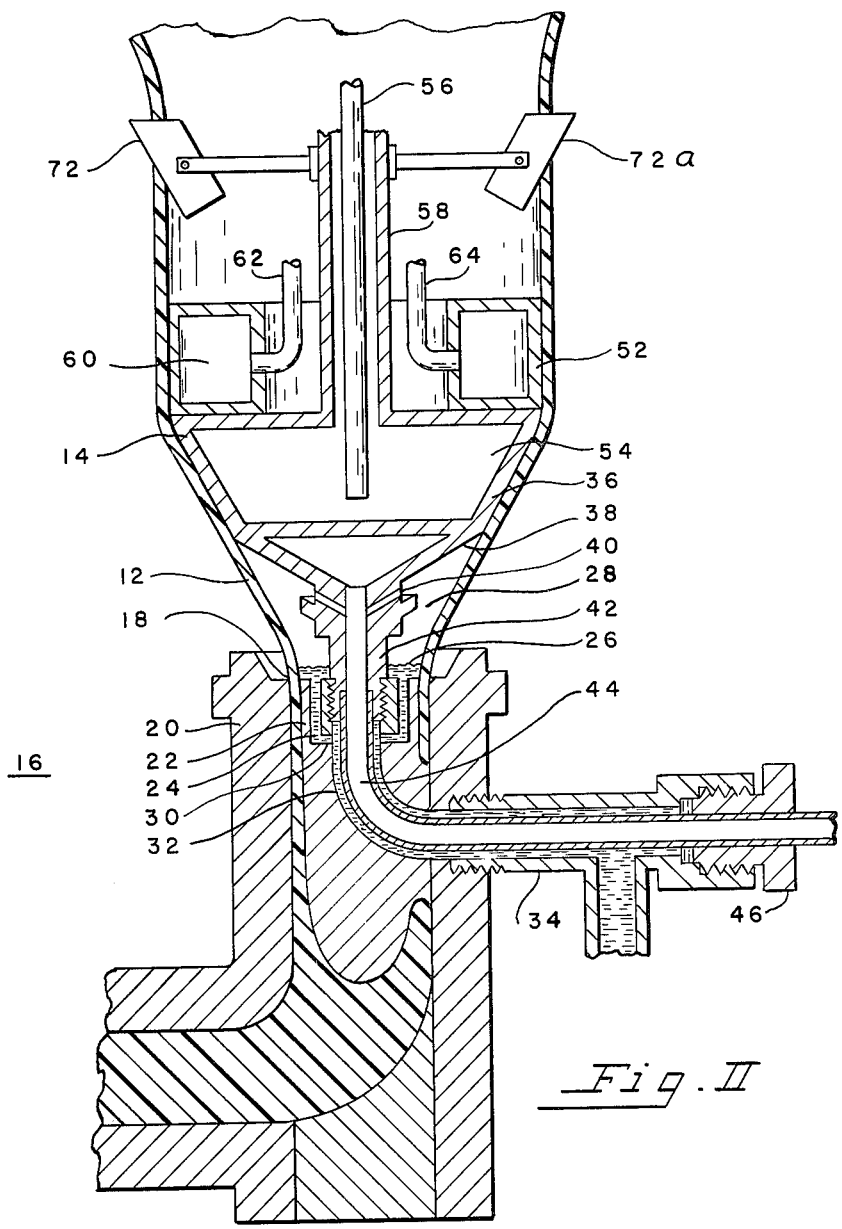
Fig. II
LORING J. BERGGREN
CHARLES T. HATHAWAY
INVENTORS
BY James C. Logomasini
ATTORNEY

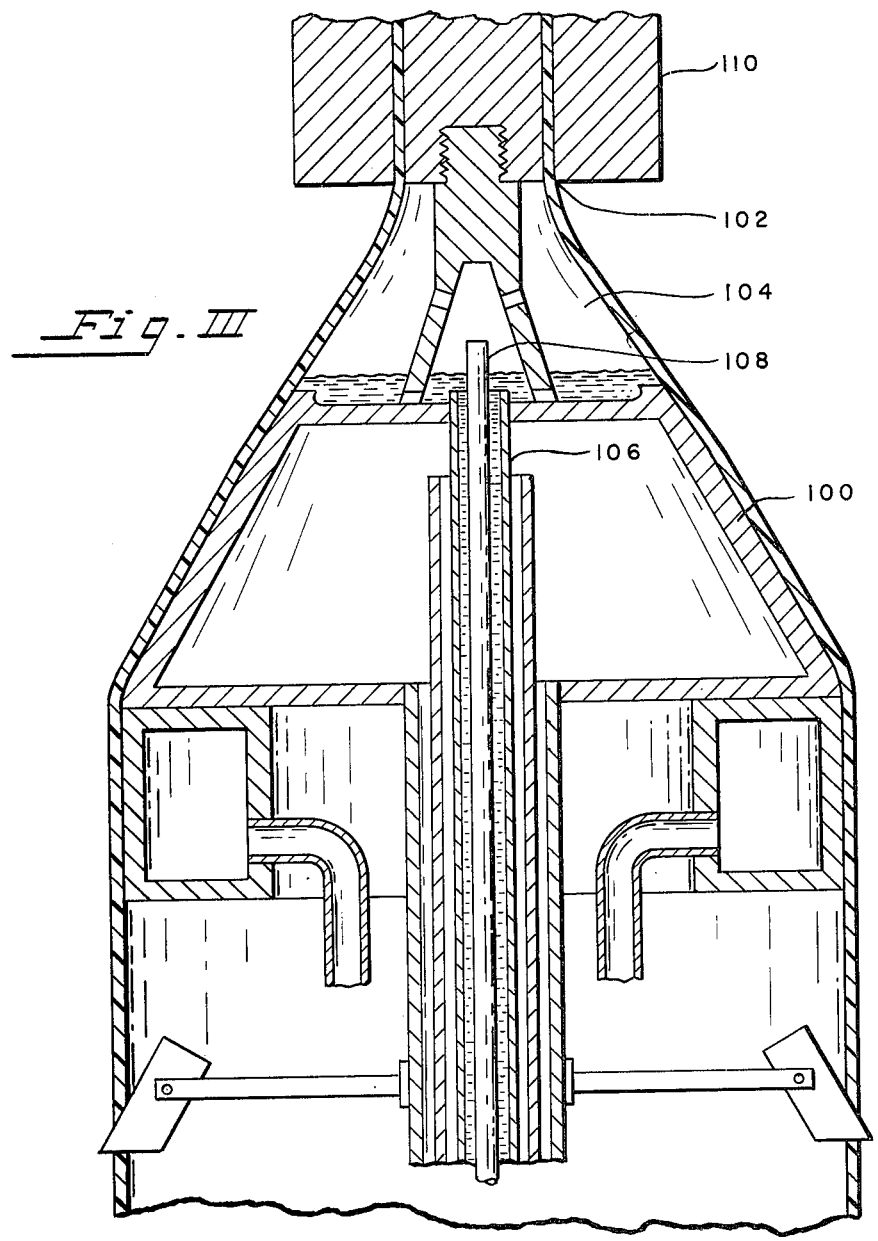
Fig. III

United States Patent Office 3,239,588
Patented Mar. 8, 1966

3,239,588
METHOD FOR TUBULAR BIAXIAL ORIENTATION
Loring J. Berggren, Wilbraham, Mass., and Charles T. Hathaway, Covina, Calif., assignors to Monsanto Company, a corporation of Delaware
Original application Nov. 15, 1961, Ser. No. 152,469, now Patent No. 3,160,918, dated Dec. 15, 1964. Divided and this application Aug. 12, 1964, Ser. No. 389,023
7 Claims. (Cl. 264—209)

This application is a division of copending application S.N. 152-469, filed November 15, 1961, now Patent No. 3,160,918.

The present invention is directed to films and sheets constituted of thermoplastic synthetic polymeric material and more particularly, to the introduction of biaxial orientation into films of this type, utilizing a solid mandrel technique, without adversely affecting surface characteristics.

Biaxial orientation of polymer films is most generally attained by one of two orientation processes or techniques. These can be described as the tubular and the flat web processes. Of the two, the tubular process has reached extensive use because of its simplicity of operation. The tubular process also leads to less scrap material when compared to the flat web process. In this latter regard, the flat web process, which relies on tenter-type stretchers, requires considerable edge trim, the result of damage caused by the clamps used by the tenters.

In the past, the tubular orientation process has generally relied upon a gaseous mandrel, which is actually a capative air or other gas bubble over which the tube of film is advanced at the proper temperature, and during which longitudinal or machine and transversal extension or stretching is introduced into the film.

The tubular orientation technique using a gaseous mandrel has performed quite satisfactorily in providing orientation in some polymer materials. By contrast, it has been less than satisfactory in providing biaxial orientation in polymer materials such as polystyrene. Most of the stretching of polymer materials such as polystyrene takes place at film temperatures, high above its glassy transition temperature where little or no orientation can be produced with the result that the film is brittle and easily ruptured during this stage of advancement. Consequently, internal pressure by the gaseous bubble causes enlargement to take place at this point of least resistance, i.e., at or close to the die from which the tube of polystyrene is being advanced, where the temperature is highest and the polymer viscosity lowest. Our copending application S.N. 80,465, filed January 3, 1961, now abandoned, describes a process designed to introduced biaxial orientation into a tubularly-shaped member of thermoplastic synthetic polymeric material by means of a rigidly constructed mandrel stationed intermediate of an annular extrusion die orifice and take-off means. Although the tubular orientation technique using rigidly constructed mandrel has performed quite satisfactorily in providing biaxial orientation in polymer materials such as polystyrene, the rigid mandrel in some instances has caused scratch marks on the surface of polymer films. In the case of some polymer films, such as polyolefins, the coefficient of friction between the film surface and the contacting surface of the rigid mandrel is extremely high which results in snagging and/or tearing of the polymer tube. The magnitude of this effect will generally depend to a large extent on the temperature conditions used during the orientation process. Consequently, for those thermoplastic materials unsuited to either the gaseous or rigid mandrel techniques, the flat web process is still generally utilized.

Accordingly, it is a principal object of the present invention to provide a method by which to introduce, and incidentally maintain, biaxial orientation in films constituted of thermoplastic synthetic polymeric material using a lubricated tubular stretching technique.

Another object is to provide a method for producing films of polymeric materials exhibiting enhanced properties of strength and appearance and unmarried surfaces, the result of their having been biaxially oriented by lubricated tubular stretching techniques.

Other objects of the invention will in part be obvious and will in part appear hereinafter.

These and other objects of the present invention can be obtained by a method for introducing biaxial orientation into a tubularly-shaped member of thermoplastic synthetic polymeric material comprising the steps of (1) extruding a tubular member of thermoplastic synthetic polymeric material, (2) lubricating the internal surface of said tubular member, (3) laterally and longitudinally expanding said tubular member by drawing said tubular member over and in contact with a diverging mandrel while maintaining the temperature of said tubular member above its glassy temperature and (4) cooling said tubular member below its glassy transition temperature.

The following drawings are provided for the purpose of illustrating various embodiments of the present invention:

FIGURE I is a side elevation with parts broken schematically illustrating apapratus which may be employed in the present invention;

FIGURE II is a schematic representation in section and with parts broken particularly illustrating a mandrel and die head combination which can be used in practice of the present invention;

FIGURE III is a schematic representation in section and with parts broken showing a second embodiment of a mandrel which can be used in practice of the present invention.

Referring to the drawings wherein like numbers refer to like parts throughout, and first to FIG. I, a lubricating biaxial orientation apparatus 10 is shown in conjunction with a tubular member 12 of synthetic polymeric material, the latter designed to be biaxially oriented while being advanced over an externally lubricated mandrel 14.

Specifically, an extruder head 16, the remainder of the extruder not being shown, is disclosed more clearly in FIG. II as having an annular die orifice 18 defined between a die head casing 20 and a die core 22 and an inner annular lubricating groove 24 in the top of said die core 22, concentric to the annular die orifice 18. Tubular member 12 is extruded from die orifice 18 and thereafter caused to be drawn over the exterior of mandrel 14. Lubricating fluid 26 flows upwardly from the annular lubricating groove 24 into the enclosed area 28, defined by the connecting boundries of the tubular member 12, the die core 22 and the mandrel 14. The inner surface of the tubular member 12 is thereby coated with the lubricating fluid 26 prior to being drawn over the exterior of mandrel 14 thereby decreasing the resistance or coefficient of friction between the tubular member 12 and external surface of the mandrel 14.

In the embodiment shown in FIG. II, fresh lubricating fluid 26 enters the annnular lubricating groove 24 through a plurality of apertures 30 from a central passageway 32 hollowed out of die core 22 and extended through the die head casing 20. The passageway 32 is further extended by means of feed pipe 34 to an external source of lubricating fluid. The lubricating fluid enters the passageway 32 through the agency of feed pipe 34.

As the tubular member 12 is advanced upwardly over the exterior of mandrel 14, the rather tight clearances between the tubular member 12 and the diverging advance section 36 of mandrel 14, will tend to force excess fluid lubricant to drain downwardly along the rather sharply tapered advance end 38. Although this excess lubricating fluid may be allowed to drain back to the annular lubricating groove 24, it is sometimes preferable to isolate the excess fluid lubricant from the system, particularly if impurities or contaminant have been absorbed by the excess fluid lubricant. A system for isolating excess fluid lubricant is shown in FIG. II wherein a plurality of apertures 40 at the base of mandrel 14 will conduct excess lubricating fluid 26 to the hollowed out portion of stationing projection 42 downwardly to discharge pipe 44 running concentrically within the central passageway 32 and feed pipe 34 separating externally to feed pipe 34 through bushing 46. This system also serves as a vent to prevent gas buildup within the enclosed area 28.

The level of the lubricating fluid 26 within the enclosed area 28 should be maintained constant both to prevent the level from falling below the top of the annular lubricating groove 24 and to avoid the varying of fluid pressures against the inner surface of the tubular member 12.

Lubricating fluid level control may be accomplished by any suitable means such as gravity systems, mechanical pumps, manometer legs, gas pressure systems and similar devices. A rather simple but effective system is illustrated in FIG. I wherein fresh lubricating fluid 26 is supplied to the extruder head 16 through feed pipe 34 from a reservoir tank 48. The fluid level within the reservoir tank 48 is maintained constant by continuously supplying make up fluid lubricant to said reservoir tank through supply pipe 50, integrated to a source not shown. The level of the fluid within the reservoir tank 48 will determine the level within the enclosed area 28 (see FIG. II) hydrostatically. It is generally desirable to utilize a reservoir tank of rather large diameter to optimize fluid level control.

Mandrel 14 is shown stationed above, and in axial alignment with the said annular die orifice 18 and lubricating groove 24. This alignment can be obtained in the manner shown in FIG. II by providing mandrel 14 at the advanced end thereof with a stationing projection 42 shown of cylindrical configuration, which is adapted to be tapped or screwed into the top of the hollowed out portion of the die core 22 thereby sealing off the passageway 32.

As previously described, mandrel 14 is provided externally with an effective longitudinally tapered advance end 38 terminating in the advance direction in stationing projection 42. The effect obtained on the advance end 38 then is that of a truncated cone. The tubular member 12 does not contact this portion of said mandrel. Immediately above the advanced end 38, mandrel 14 is further provided externally with a longitudinal section 36, of diminished taper having a continuous curvature when considered in cross-section. In this regard, the curvature preferably contributes a peripheral outline or profile defining a circle, but it can also define various other elliptical shapes.

The advance section 36 provides the situs where orientation, both longitudinal and lateral of tube 12, takes place. It is along this longitudinal section 36, wherein lubrication between the inner surface of tubular member 12 is of vial importance to prevent strain patterns, scratch marks, tearing, etc., from occurring on the surface of the tubular member 12 during the orientation process. The after cylindrical section 52 of mandrel 14, which is contiguous to or a rearward extension of the previously described advance section 36, is by comparison of constant diameter and acts as a situs where the biaxial orientation once initiated is permanentized by chilling or cooling of tube 12. The necessity for lubrication along the after cylindrical section 52 is generally not as important since the coefficient of friction is generally greater along the advance section 36 due to the resistance to stretching offered by the tubular member 12. Again, the temperature of the tubular member 12 is generally lower during advancement over the cylindrical section 52 serving in most cases to further decrease the coefficient of friction between the tubular member and said cylindrical section. In any case, there is generally sufficient coating of lubricant remaining on the tubular member 12 during advancement along the cylindrical section 52 to alleviate most frictional problems. For the more rigid and stronger polymer materials, increased lubrication along the cylindrical section 52 may be readily had by increasing the level of the fluid lubricant 26 to completely fill the inclosed area 28 between the die core 22 and the diverging advance end 38 of the mandrel 14. The return flow from discharge pipe 44 could be restricted or controlled by any suitable means. The increased fluid pressure will tend to force increased fluid lubricant upwardly along the tapered advance section 52 and cylindrical section 52 of the mandrel 14.

Temperature control is important since different polymer materials will generally have different optimum orientation temperatures and the lubricating process is in some cases affected by the temperature of the polymer film. Therefore, mandrel 14 is provided with a plurality of internal temperature control zones. Heating zone 54 is located to the interior of tapered advance end 38. This expedient is designed to provide or maintain and transfer that temperature to tubular member 12 at which biaxial orientation can be introduced into the same, with the accompanying stretching of tubular member 12. Stand pipe 56, integrated to a source, not shown, serves to introduce heated fluid into heating zone 54. Exhaust pipe 58 is installed for the purpose of making the heating fluid system of a continuous circulating nature. The secondary temperature control zone 60, located above the previously-described heating zone 54, can be used to heat or cool the polymer film to an optimum temperature consistent with both the film orientation and lubricating operation. In order that the secondary temperature control zone can be provided continuously with fluid for obtaining the desired temperature, supply pipe 62 and exhaust pipe 64, both of which are connected to a source of fluid are utilized.

In order to advance tube 12, at a predetermined speed, over mandrel 14, take-off means are provided, which are shown in FIG. I, taking the form of sheet bending and support rolls 66–66a and 68–68a, and pairs of pinch rolls 70 and 70a, the pinch rolls being provided with a drive motor, or other source of power not shown. The rate of take-off can be varied to obtain the desired longitudinal stretch consonant with lateral stretch imparted due to the configuration of the mandrel.

Mandrel 14 is located intermediate, process-wise of annular die orifice 18, and the take-off means described immediately above. A film-slitting means, more particularly knives 72 and 72a, are located at the after (or upper) end of mandrel 14 in order that tube 12 upon leaving mandrel 14 can be slit into two equi-width sheets and made available to be advanced through the various components of the take-off means in the form of two separate single-width sheets. This prevents creasing which would be otherwise initiated if the film were directed through the take-off means in tubular form. If greater sheet widths are desired, a single film-slitting knife may be employed.

The choice of lubricant will be affected by the nature of the particular polymer being biaxially oriented and the temperature conditions utilized during the process. In other words, the particular lubricant should not deleteriously affect the extruded polymer material and should be liquid during initial contact with said extruded polymer. The lubricants utilized may serve auxiliary purposes such as a protective coating for the biaxially oriented polymer film. In the case of protective coatings, the lubricant can be of a type that would serve as a liquid lubricant over the hot portion of the mandrel and as a solid lubricant over the cold portion of the mandrel. However, in many cases it is preferable that the liquid or solid film be removed from the polymer web after orientation. The method employed for removal of the lubricant will generally vary depending on the nature of the lubricant, for example, a subsequent drying operation would adequately remove the volatile-type fluid lubricant while various solvents could be utilized for the removal of many other types of lubricant. In the embodiment shown in FIG. I, solvent dip tanks 74 and 74a are positioned intermediate to the sheet bending and support rolls 66–66a and 68–68a, and the pairs of pinch rolls 70 and 70a. Roll pairs 76 and 76a positioned in the solvent dip tanks 74 and 74a, respectively, guide the polymer film or halves of the tubular member 12 into and below the level of solvent, thereby dissolving and washing away the liquid lubricant 26 covering the said polymer film.

FIGURE III illustrates a second embodiment of a mandrel which can be used in practice of the present invention. This mandrel, which is designated 100, is inverted such that the annular die orifice 102 is axially aligned above the mandrel 102 and fluid lubricant is supplied to the enclosed area 104 through supply pipe 106 running axially through mandrel 100. Stand pipe 108, positioned concentrically within supply pipe 106, serves as a vent to prevent pressure accumulation within the enclosed area 104. The particular advantage of this embodiment is that the lubricating fluid does not contact the rather hot surfaces of the extruder head 110 and therefore improved lubricant temperature control is affected.

The mandrel, which can be used in practice of the present invention, is of rigid construction as to present a solid face or surface to the tubular member of thermoplastic material where biaxial orientation is being introduced. The exterior shell of the mandrel, which can be of unitary or divisional construction, can be fabricated from rigid materials such as various metals, alloys and ceramics, which have the capacity for conducting heat, relatively uniformly and as adiabatically as possible, in order to contribute uniformity of orientation and, correspondingly, uniformity of physical properties and appearance in the final biaxially oriented film product. Materials particularly recommended for this are steel, aluminum, copper and various nickel alloys. The exterior should be polished in order to further reduce the frictional forces between the mandrel and the interior of the tube of film being advanced over the same.

The overall size of the mandrel in cross-section or circumference will depend upon the internal circumference of the tubular member which is desired to be attained with orientation (stretching) while the circumference of the most advanced tubular film contacting end can reflect the internal diameter of the tubular member prior to introduction of orientation, which can be that of the tubular member upon its being extruded from the die. The angle of taper on the advanced section can vary, depending upon the amount of longitudinal or machine direction and lateral or transverse orientation which is intended to be introduced into the tubular member. As previously mentioned, the type of fluid lubricant utilized will vary depending on the type of polymer film being oriented and the auxiliary purposes to be served, e.g., coating, etc. In illustration of the use of a lubricated mandrel in conjunction with a specific polymeric material, the following example is presented without any intention of limiting the scope of the present invention. A mandrel such as shown in FIG. II, having an overall diameter of 7.5 inches and a taper angle for the advance end of 60° can be used to orient a tubular member of polypropylene having an average molecular weight of 240,000–270,000, a gauge of 40 mil and an interior circumference of 4.7 inches at a final advance speed of 55 feet per minute. The fluid lubricant is glycerin which is applied to the inner surface of polypropylene tube before stretching at a temperature range of 200–300° F. The glycerin level within the enclosed area should be approximately ⅛ of an inch. After the polypropylene tube leaves the mandrel, its gauge (thickness) has been reduced to 1 mil and it has an internal circumference of 23.5 inches, both in permanentized condition with a residual coating of lubricant of approximately .00005 to .0001 inch. This coating is later removed by dipping the polymer film in the solvent dip tank containing water at approximately room temperature. The resulting film when tested according to ASTM–D1504 exhibits 150–300 p.s.i. orientation stress in the machine direction and 100–200 p.s.i. in the lateral direction. In addition, the surface of the polypropylene film shows no signs of blemishes, scratch marks or other physical defects. In carrying out this illustrative lubricated orientation operation, the temperature of the glycerin is maintained between 210–290° F. while varying the secondary temperature control zone within the range of 60–175° F. and the heating zone between 225–245° F.

The operation of the biaxial orientation apparatus of the present invention in its most generic sense can be carried out by advancing the tubular member to be oriented, after extrusion of the same, over a rigid mandrel, where it is first lubricated, secondly, biaxially oriented and thirdly, orientation is permanentized by cooling. Thereafter, the tubular member is caused to be slit and formed into a single-width flat sheet, in which form it is directed through a lubricant-removal bath to dissolve or wash away the lubricant, and then through a take-off means, and at final wrap-up it eventuates as a single-width roll of biaxially oriented thermoplastic material. Advance of the tubular member, and later the flat sheet of synthetic thermoplastic material, as previously described, is effected by the take-off means which includes one or more prime movers or driving means.

During operation of the presently sponsored apparatus, time and temperature are important considerations. While these will vary according to the identity; principally the chemical identity of the lubricant and of the thermoplastic material being subjected to orientation, it can be broadly stated that lubrication and orientation is introduced at a temperature above about the glassy transition temperature ($T_{(g)}$) of the given thermoplastic material. More specifically, the temperature of the fluid lubricant will depend on the orientation temperature while the orientation temperature will depend upon whether the material is of the non-crystallizable nature as in the case of atactic polystyrene, low density polystyrene, polyvinyl chloride, etc., or a crystallizable nature such as in the case of isotactic polystyrene, linear polyethylene, polypropylene, etc.

In the former situation, orientation can be introduced at a temperature which is above the glassy transition temperature sufficiently to permit elongation without failure at practical rates, e.g., for polystyrene (atactic) 100% to 500% elongation at 10% to 200% elongation per second. In the case of the crystallizable polymers then, the orientation temperature is again above the glassy transition temperature and may be as high as to approach the melting point of the material. In any case, the temperature at which orientation can be expeditiously introduced can be assessed relative to the temperature where crystallization of the polymer takes place at a practical rate, simultaneous and/or subsequent to the introduction of orientation. Glassy transition temperature, ($T_{(g)}$) refers to that temperature where a material on being advanced through (raising) will change from a solid to a visco-elastic state. This temperature is generally not sharply defined, but rather extends over a range of a few degrees in temperature (Fahrenheit or Centigrade). This temperature is also known as the second order transition temperature. In all cases, the lubricating and the orientation steps should not be carried out at a temperature which exceeds the melting point for the synthetic polymer material being oriented, that is the temperature where it advances to a liquid state.

The permanentizing step, which is designed to perpetuate orientation once introduced, is carried out at a temperature below the glassy transition temperature ($T_{(g)}$) and varies according to the synthetic plastic material involved. Illustrative of this, polystyrene, polyethylene and polyvinyl chloride undergo transitions in the temperature region ($T_{(g)}$) in the neighborhood of 190° F., while for polypropylene a similar transition takes place at about 32° F. If the melting point of the fluid lubricant is above the temperature required for permanentizing the orientation of the film, the fluid lubricant will tend to solidify while the polymer tube is being advanced over cylindrical portion of the mandrel. This effect is usually not serious since the permanentizing is affected at the extreme latter portion of the mandrel and may even be desirable for protectively coating the film.

The sponsored method contributes biaxial orientation to polymer material which is simple in operation and serves to minimize polymer film surface problems. Additionally, the simplicity of the method serves to reduce both operating cost and capital when compared to the flat web process utilizing tenter frames.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description shall be interpreted as illustrative and not in a limiting sense.

What is claimed is:

1. A method for introducing biaxial orientation into a tubularly-shaped member of thermoplastic synthetic polymeric material comprising the steps of (1) extruding a tubular member of thermoplastic synthetic polymeric material, (2) lubricating the internal surface of said tubular member with a liquid lubricant at a temperature of 210°–290° F., (3) laterally and longitudinally expanding said tubular member by drawing said tubular member over and in contact with a diverging mandrel while maintaining the temperature of said tubular member above its glassy transition temperature and (4) cooling said tubular member below its glassy transition temperature.

2. The method according to claim 1 wherein the thermoplastic synthetic polymeric material is polystyrene.

3. The method according to claim 1 wherein the thermoplastic synthetic polymeric material is linear polyethylene.

4. The method according to claim 1 wherein the thermoplastic synthetic polymeric material is polypropylene.

5. The method according to claim 4 wherein the lubricant used to lubricate the internal surface of said tubular member is glycerin.

6. A method for introducing biaxial orientation into a tubularly-shaped member of thermoplastic synthetic polymeric material comprising the steps of (1) extruding a tubular member of thermoplastic synthetic polymeric material, (2) lubricating the internal surface of said tubular member, (3) laterally and longitudinally expanding said tubular member by drawing said tubular member over and in contact with a diverging mandrel while maintaining the temperature of said tubular member above its glassy transition temperature, (4) cooling said tubular member below its glassy transition temperature and (5) removing the lubricant covering the internal surface of said tubular member.

7. A method for introducing biaxial orientation into a tubularly-shaped member of thermoplastic synthetic polymeric material comprising the steps of (1) extruding a tubular member of thermoplastic synthetic polymeric material, (2) lubricating the internal surface of said tubular member, (3) laterally and longitudinally expanding said tubular member by drawing said tubular member over and in contact with a diverging mandrel while maintaining the temperature of said tubular member above its glassy transition temperature, (4) cooling said tubular member below its glassy transition temperature and (5) exposing said tubular member to a solvent for dissolving and washing away the lubricant.

References Cited by the Examiner

UNITED STATES PATENTS 3,090,991  5/1963  Hathaway _____ 18—14

ALEXANDER H. BRODMERKEL, *Primary Examiner.*
ROBERT F. WHITE, *Examiner.*